United States Patent

Tanabe et al.

[11] Patent Number: 5,774,613
[45] Date of Patent: Jun. 30, 1998

[54] FERRULE FOR AN OPTICAL FIBER CONNECTOR

[75] Inventors: Takashi Tanabe; Koji Yamamoto, both of Tokyo, Japan

[73] Assignee: NEC Corporation, Tokyo, Japan

[21] Appl. No.: 599,125

[22] Filed: Feb. 9, 1996

[30] Foreign Application Priority Data

Feb. 10, 1995 [JP] Japan .................................. 7-023064

[51] Int. Cl.[6] ................................................... G02B 6/36
[52] U.S. Cl. ................................. 385/84; 385/85; 385/68
[58] Field of Search ................................ 385/50, 60, 68, 385/72, 78, 84, 85

[56] References Cited

U.S. PATENT DOCUMENTS 5,018,821  5/1991  Kurata ........................................ 385/72
5,499,310  3/1996  Ueda ......................................... 385/84

FOREIGN PATENT DOCUMENTS 63-307409  12/1988  Japan ....................................... 385/84

*Primary Examiner*—Phan T. H. Palmer
*Attorney, Agent, or Firm*—Young & Thompson

[57] ABSTRACT

A ferrule for an optical fiber connector has a cylindrical sleeve or body (1) and a capillary (3) received in the sleeve 1. The sleeve (1) has thereinside a fiber holding portion (2a) adjoining one end of the sleeve (1) and for holding a built-in optical fiber (4), a capillary holding portion (2b) next to the fiber holding portion (2a), and a fiber inserting portion (2c) next to the capillary holding portion (2b) and for inserting an optical fiber (6). The fiber holding portion (2a) and the fiber inserting portion (2c) have the smallest diameter and the largest diameter, respectively. The diameter of the capillary holding portion (2b) is substantially equal to the outside diameter of the capillary 3. The axis of the fiber holding portion (2a) is accurately coincident with the axis of the sleeve (1). The capillary (3) is held in the capillary holding portion (2b) while the fiber (4) extends over the fiber holding portion (2a) and a through bore formed in the capillary 3. A through notch (5) is formed in the capillary (3) and filled with a refractive index matching material (7). The Fiber (6) is inserted into and affixed to the ferrule via the fiber inserting portion (2c).

4 Claims, 2 Drawing Sheets

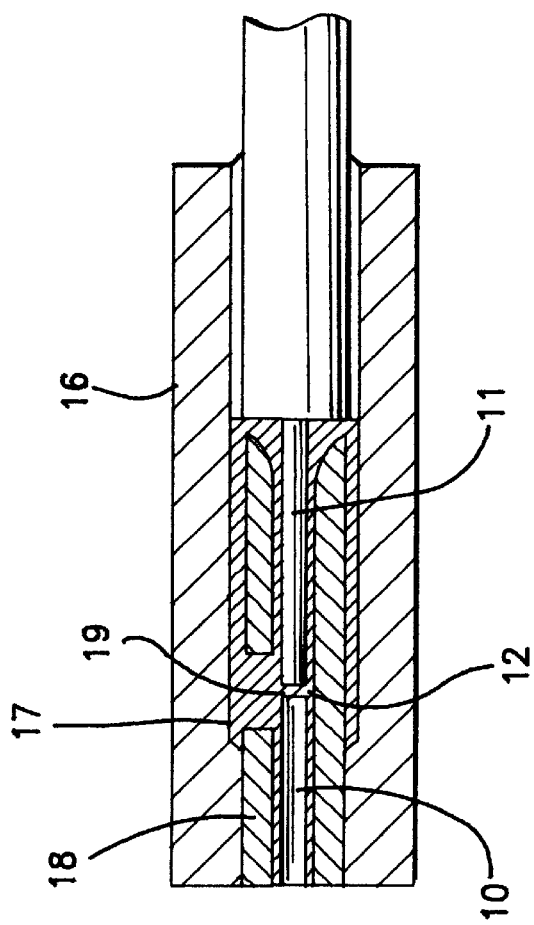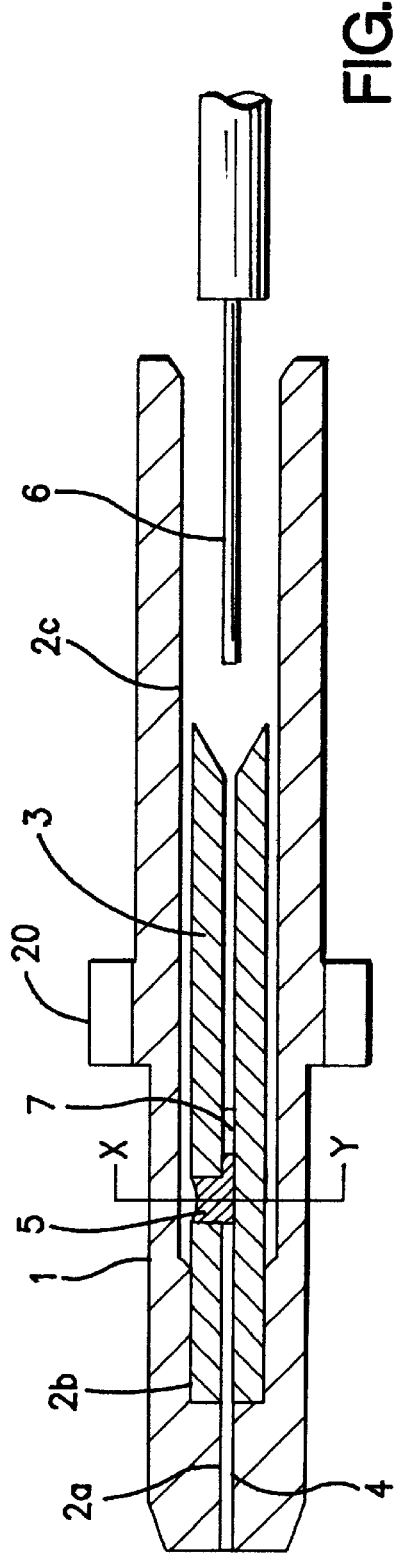

FERRULE FOR AN OPTICAL FIBER CONNECTOR

BACKGROUND OF THE INVENTION

The present invention relates to a ferrule for an optical fiber connector and, more particularly, to an optical fiber connector ferrule used to connect optical fibers or an optical fiber and an optical circuit part at a construction site.

One of conventional ferrules for optical fiber connectors has a body or cylindrical sleeve and a capillary disposed in the sleeve, as taught in, e.g., Japanese Patent Laid-Open Publication No. 63-307409. The sleeve of this type of ferrule is formed with a smaller diameter portion and a larger diameter portion thereinside. The capillary has a part thereof retained in and affixed to the smaller diameter portion and has the other part extending into the larger diameter portion.

An axial bore is formed throughout the capillary at the center thereof. An optical fiber is received in and affixed to the through bore of the capillary while coinciding with the axis of the sleeve. The capillary and the above built-in fiber are exposed to the outside at the end face of the sleeve adjoining the smaller diameter portion, and are mirror-finished by grinding.

A notch is formed in the part of the capillary positioned in the larger diameter portion of the sleeve. The notch extends from the wall of the through bore of the capillary to the outer periphery of the capillary. The through bore of the capillary is flared outward at the end of the capillary disposed in the larger diameter portion.

However, the above conventional ferrule has some problems left unsolved, as follows. Generally, the prerequisite with the connection of single-mode optical fibers is that each fiber has the axis of its core aligned with the axis of the sleeve with accuracy as high as 1 micron or less. This requisite has customarily been met by the following procedure. First, the outside diameter of the sleeve and the inside diameter of the smaller diameter portion of the sleeve are provided with relatively low accuracy, and the outside diameter of the sleeve is selected to be larger than a predetermined diameter beforehand. In this condition, the capillary with the built-in fiber and the sleeve are affixed to each other by adhesive. Then, the end face of the sleeve is mirror-finished by grinding together with the capillary and built-in fiber. Subsequently, the outside diameter of the sleeve is machined for centering on the basis of the axis of the core of the built-in fiber, thereby removing an error ascribable to the assembly. Although such a procedure provides the ferrule with a predetermined dimension, the centering operation needs a highly accurate special machining device. This obstructs batch processing and thereby prevents the production cost from being reduced.

The above centering of the outside diameter of the sleeve cannot be omitted unless accurate machining of the order of submicrons is used. Such accurate machining also obstructs mass production.

SUMMARY OF THE INVENTION

It is therefore an object of the present invention to provide an optical fiber connector ferrule which does not have to have its outside diameter centered on the basis of the axis of the core of an optical fiber, and is feasible for mass production.

A ferrule for an optical fiber connector of the present invention has a cylindrical sleeve and a capillary disposed therein. The sleeve has thereinside a fiber holding portion adjoining one end of the sleeve, a fiber inserting portion adjoining the other end of the sleeve, and a capillary holding portion intervening between the fiber holding portion and the capillary holding portion.

The capillary is fixedly retained by the capillary holding portion. An axial through bore is formed in and at the center of the capillary in order to receive and hold an optical fiber therein. The through bore is flared outward at the end of the capillary positioned in the capillary inserting portion.

When the capillary is held by the capillary holding portion, an optical fiber can extend over both the through bore of the capillary and the fiber holding portion. A through notch is formed from the inner wall of the through bore to the outer periphery of the capillary.

With the above configuration, it is possible to accurately bring the axis of the sleeve and that of the fiber holding portion into coincidence beforehand.

BRIEF DESCRIPTION OF THE DRAWINGS

The above and other objects, features and advantages of the present invention will become apparent from the following detailed description when taken with the accompanying drawings in which:

FIG. 1 is a section of a conventional ferrule for an optical fiber connector;

FIG. 2 is a section of a ferrule for an optical fiber connector and embodying the present invention;

DESCRIPTION OF THE PREFERRED EMBODIMENTS

Figure 3:
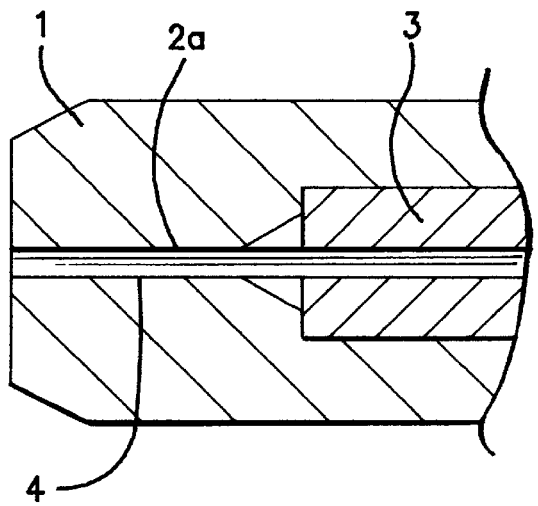
FIG. 3 is a fragmentary section showing an alternative embodiment of the present invention.

To better understand the present invention, a brief reference will be made to a conventional ferrule for an optical fiber connector, shown in FIG. 1. The ferrule to be described is taught in Japanese Patent Laid-Open Publication No. 63-307409 mentioned earlier. As shown, the ferrule has a cylindrical sleeve 16, and a capillary 18 disposed in the sleeve 16. The sleeve 16 has a through bore 17 made up of a smaller diameter portion and a larger diameter portion. The capillary 18 has a part thereof retained by the smaller diameter portion and extends into the larger diameter portion.

An optical fiber 10 is fixedly received in a bore formed throughout the axial length of the capillary 18. The axis of the built-in fiber 10 and that of the sleeve 16 are coincident with each other. Specifically, the fiber 10 and capillary 18 are affixed to the sleeve 16, and then the outer periphery of the sleeve 16 is centered by machining on the basis of the center of the core of the fiber 10. The capillary 18 and fiber 10 are exposed to the outside at the end face of the sleeve 16 adjoining the smaller diameter portion of the bore. The end face of the sleeve, including the capillary 18 and fiber 10, are mirror-finished by grinding.

A through notch 19 is formed in the portion of the capillary 18 located in the larger diameter portion of the sleeve 16, and extends from the inner periphery to the outer periphery of the capillary 18. The end of the larger diameter portion of the capillary 18 is flared outward. The flare allows an optical fiber 11 to be easily inserted into the capillary 18 from the right-hand side, as viewed in FIG. 1. The tip of the optical fiber 11 is also mirror-finished by grinding. A silicon-based refractive index matching material 12 is filled in the notch 19.

The problem with the above ferrule structure is that centering the sleeve 16 on the basis of the center of the core of the fiber 10 is not practicable without resorting to a highly accurate special machining device. This obstructs batch processing and thereby prevents the production cost from being reduced.

Referring to FIG. 2, a ferrule for an optical fiber connector and embodying the present invention is shown. As shown, the ferrule has a cylindrical sleeve or body 1. The sleeve 1 includes a fiber holding portion 2a adjoining the left end of the sleeve 1, as viewed in FIG. 2, and having the smallest diameter. An optical fiber 4 is fixedly received in the fiber holding portion 2a. The sleeve 1 also includes a fiber inserting portion 2c adjoining the other end of the sleeve 1 and having the largest diameter. An optical fiber 6 is inserted into the fiber inserting portion 2c. A capillary holding portion 2b intervenes between the opposite portions 2a and 2c, and has substantially the same diameter as the outer periphery of a capillary 3. The sleeve 1 has a length of about 20 millimeters, and an outside diameter of about 2.5 millimeters. The fiber holding portion 2a has a length of about 3 millimeters and an inside diameter of about 0.13 millimeter, while the capillary holding portion 2b has a length of about 1 millimeter to 2 millimeters and an inside diameter of about 1.2 millimeters. As shown in FIG. 3, it is desirable that the end of the fiber holding portion 2a adjoining the capillary holding portion 2b be flared toward the portion 2b. This configuration will facilitate the insertion of the built-in fiber 4.

The capillary 3 is formed with an axial through bore at the center thereof for holding the built-in optical fiber 4 and an optical fiber 6. The capillary 3 has a part thereof fixedly retained by the capillary holding portion 2b of the sleeve 1. The capillary 3 has an overall length of about 10 millimeters to 11 millimeters and an outside diameter of about 1.2 millimeters. The open end of the capillary 3 disposed in the fiber inserting portion 2c is flared outward in order to facilitate the insertion of the optical fiber 6 into the capillary 3.

A through notch 5 is formed in the capillary 3 from the inner wall of the through bore to the outer periphery of the capillary 3. When the capillary 3 is held in the sleeve 1, the notch 5 is positioned in the fiber inserting portion 2c which is larger in diameter than the other portions 2a and 2b of the sleeve 1. Hence, the inside of the capillary 3 is communicated to the outside of the sleeve 1 via the notch 5 and fiber inserting portion 2c.

When the above ferrule is actually used to connect optical fibers, the short built-in fiber 4 is disposed in both the fiber holding portion 2a of the sleeve 1 and the capillary 3. At this instant, the end face of the sleeve 1 adjoining the fiber holding portion 2a is mirror-finished by grinding together with the fiber 4. The end of the fiber 4 adjoining the capillary 3 corresponds in position to the notch 5. The notch 5 is filled with a refractive index matching material 7 which is a silicon-based gel-like transparent material having substantially the same refractive index as optical fibers. Such a ferrule is prepared beforehand. The insertion of the fiber 5 into the ferrule and the connection thereof to another optical fiber are performed at a construction site.

The sleeve 1 is formed of zirconica ceramics. Specifically, a mixture of zirconia powder and binder is molded in a predetermined configuration and then sintered. Thereafter, the sleeve 1 is machined for centering. Because the sleeve 1 is molded integrally with the fiber holding portion 2a for holding the built-in fiber 4, the axis of the sleeve 1 and that of the portion 2a can be readily coincident with each other with accuracy of the order of submicrons.

Therefore, the present invention makes it needless to center the outer periphery of a ferrule on the basis of the center of the core of the fiber 4. Specifically, only if the fiber 4 is inserted into and affixed to the fiber holding portion 2a of the sleeve 1, the axis of the sleeve 1 and the center of the core of the fiber 4 can be brought into coincidence with accuracy as high as less than 1 micron.

For the sleeve 1, use may be made of stainless steel, covar or similar metal. However, ceramics will enhance the strength and surface hardness of the ferrule and will therefore provide the ferrule with sufficient durability.

The capillary 3 should preferably be made of a material close to the sleeve 1 with respect to the coefficient of thermal expansion, e.g., ceramics, glass or metal.

The ferrule having the above configuration is assembled by the following procedure. First, the fiber 4 is inserted into the through bore of the capillary 3 and affixed thereto by adhesive. At this instant, one end of the fiber 4 protrudes about 3 millimeters to 4 millimeters from the end of the capillary 3 which will adjoin the fiber holding portion 2a of the sleeve 11, while the other end is positioned to face the notch 5. Also, the refractive index matching material 7 is filled in the notch 5.

The capillary 3 is inserted into the fiber inserting portion 2c of the sleeve 1 with the fiber 4 protruding from the capillary 3 facing the portion 2c. At this instant, the front end portion of the capillary 3 with respect to the direction of insertion and the inside of the fiber holding portion 2a and capillary holding portion 2b are coated with adhesive, as needed. After the capillary 7 has been affixed to the capillary holding portion 2b, the fiber 4 protruding from the end face of the fiber holding portion 2a is cut away. Then, the end face of the portion 2a, including the fiber 4, is mirror-finished by grinding.

At the construction site, the fiber 6 whose tip has been mirror-finished by grinding or stress-cut is inserted into and affixed to the above ferrule. The fiber 6 reaches the notch 5 formed in the capillary 3 and abuts against the end of the fiber 4 which has also been mirror-finished. Again, necessary portions are coated with adhesive, as needed. If necessary, a protective layer provided on the fiber 6 and the sleeve 1 are affixed by a metallic jig. Thereafter, the mirror-finished end face of the ferrule is joined with a similar mirror-finished end face of another ferrule or any other optical part and then affixed by an adapter.

Figure 4A:
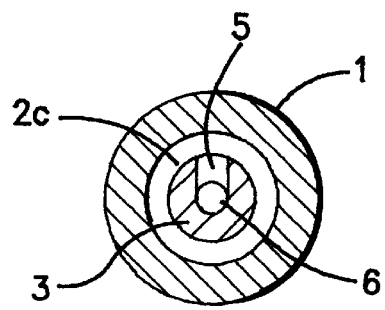
FIGS. 4A, 4B and 4C are cross-sections showing other alternative embodiments of the present invention.
Figure 4B:
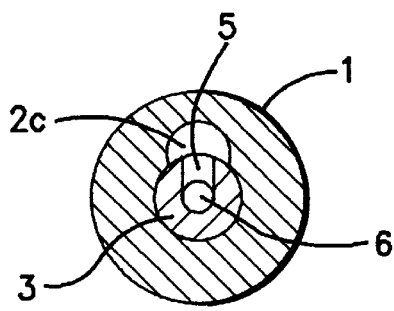
Figure 4C:
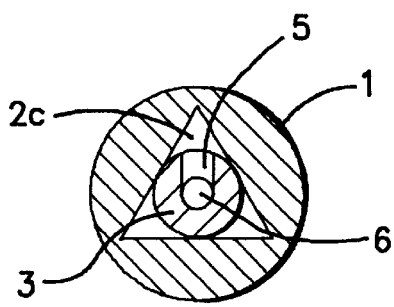

It is preferable that the inside diameter of the fiber inserting portion 2c of the sleeve 1 be slightly larger than the outside diameter of the capillary 3. This will facilitate the insertion of the fiber 6 by venting air out of the sleeve 1 and capillary 3. FIGS. 4A, 4B and 4C each shows a particular configuration of the inner wall of the fiber inserting portion 2c.

FIGS. 4A–4C are sections along line X-Y of FIG. 2, i.e., cross-sections in a plane perpendicular to the axis of the capillary 3 and containing the notch 5. As shown, the inside configuration of the portion 2c and the position of the notch 5 are so selected as to vent air out of the capillary 3 via the notch 5.

As shown in FIG. 2, the sleeve 1 may be provided with a flange 20 on its outer periphery in order to implement assembly using an adapter.

In summary, in accordance with the present invention, an optical fiber connector ferrule includes a cylindrical sleeve in which a fiber holding portion and a capillary holding portion for holding a built-in fiber and a capillary, respectively, are formed at the same time. Therefore, the ferrule does not need the conventional centering operation which uses the core of a built-in fiber as a reference, and can have the axis of the sleeve and that of the core of the above fiber to be brought into coincidence with accuracy of the order of submicrons. It follows that the ferrule can be produced by batch processing which successfully reduces the production cost. In addition, when the sleeve is formed of ceramics, its bending strength and surface hardness, and therefore its durability is enhanced.

While the present invention has been described in connection with certain preferred embodiments, it to be understood that the subject matter encompassed by the present invention is not limited to those specific embodiments. On the contrary, it is intended to include all alternatives, modifications, and equivalents as can be included within the spirit and scope of the following claims.

We claim:

1. A ferrule for an optical fiber connecting comprising:

a capillary having a first and second end and including an axial through bore for receiving an optical fiber, said through bore being flared outward at said first end of said capillary, said capillary including a through notch extending from a wall of said axial through bore to an outer periphery of said capillary;

a sleeve having an axial through bore, said sleeve surrounding said capillary and enclosing said second end of said capillary and comprising an integral holding section for directly holding a built-in fiber in said axial through bore, an axis of said axial through bore being substantially coincident with an axis of said holding section, said axial through bore in said integral holding section being flared at said second end of said capillary.

2. A ferrule as claimed in claim 1, wherein an axis of the optical fiber received in said axial through bore of said capillary are coincident with an axis of said sleeve.

3. A ferrule as claimed in claim 1, wherein said sleeve is formed of ceramics.

4. A ferrule as claimed in claim 1, wherein a fiber inserting portion of said sleeve proximate said first end of said capillary has an inner cross-sectional area larger than a cross-sectional area of said capillary.

\* \* \* \* \*